United States Patent
Poon

(10) Patent No.: US 10,296,313 B2
(45) Date of Patent: May 21, 2019

(54) SAFELY CONSUMING DYNAMICALLY-TYPED CODE FROM A STATICALLY-TYPED PROGRAMMING LANGUAGE

(71) Applicant: Roger James Poon, Covington, WA (US)

(72) Inventor: Roger James Poon, Covington, WA (US)

( * ) Notice: Subject to any disclaimer, the term of this patent is extended or adjusted under 35 U.S.C. 154(b) by 0 days.

(21) Appl. No.: 14/944,855

(22) Filed: Nov. 18, 2015

(65) Prior Publication Data

US 2016/0259633 A1    Sep. 8, 2016

Related U.S. Application Data

(60) Provisional application No. 62/081,113, filed on Nov. 18, 2014, provisional application No. 62/187,038, filed on Jun. 30, 2015.

(51) Int. Cl.
    *G06F 8/51*    (2018.01)
    *G06F 8/41*    (2018.01)
    *G06F 9/455*   (2018.01)

(52) U.S. Cl.
    CPC ........... *G06F 8/437* (2013.01); *G06F 8/51* (2013.01); *G06F 9/45529* (2013.01)

(58) Field of Classification Search
    CPC ..... G06F 8/31; G06F 8/40; G06F 8/41; G06F 8/437; G06F 8/51
    USPC ........ 717/115, 136, 137, 139, 140, 141, 143
    See application file for complete search history.

(56) References Cited

U.S. PATENT DOCUMENTS

| 5,307,490 | A  | * | 4/1994 | Davidson | H04L 29/06 709/203 |
| 6,714,991 | B1 | * | 3/2004 | Bak | G06F 9/4433 717/108 |
| 7,480,894 | B2 | * | 1/2009 | Hasson | G06F 8/70 717/115 |
| 7,895,584 | B1 | * | 2/2011 | Ma | G06F 17/5045 717/137 |

(Continued)

OTHER PUBLICATIONS

Plasmeijer, R., et al., Interactive Combining of Typed Object Code, Technical report: ICIS-R08019, Nov. 2008, 40 pages, [retrieved on Sep. 2, 2016], Retrieved from the Internet: <URL:https://pms.cs.ru.nl/iris-diglib/src/getContent.php?id=2008-Plasmeijer-CombiningObject>.*

(Continued)

*Primary Examiner* — Geoffrey R St Leger

(57) ABSTRACT

A computerized method is provided to consume a dynamically-typed language in a compatible language, and to compile source code in the compatible language to a target language. The methods make it possible to add type safety and static type checking to a superset of dynamically-typed languages, irrespective of whether the dynamically-typed languages are dynamically type-checked or not. In preferred embodiments, the methods allow for all types in an external language to be represented as a single type. In various embodiments, more than one unified external type can be allowed, each unified external type being specific to a group or class of types. In the methods, conversions are used as a mechanism to convert types. Conversions can be either implicit or explicit, and explicit conversions can be either implementation-defined or user-defined.

165 Claims, 9 Drawing Sheets

(56) References Cited

U.S. PATENT DOCUMENTS

| | | | | |
|---|---|---|---|---|
| 8,296,747 | B2* | 10/2012 | Ishizaki | G06F 17/2223 717/140 |
| 8,336,035 | B2* | 12/2012 | Lambert | G06F 9/45508 717/136 |
| 8,533,665 | B2* | 9/2013 | Yu | G06F 9/4488 717/108 |
| 8,752,035 | B2* | 6/2014 | Fanning | G06F 8/49 717/141 |
| 8,863,079 | B2* | 10/2014 | Darcy | 717/108 |
| 9,081,893 | B2* | 7/2015 | Christensen | G06F 11/3612 |
| 9,122,490 | B2* | 9/2015 | Fanning | G06F 8/433 |
| 9,348,580 | B2* | 5/2016 | Chen | G06F 9/44521 |
| 2004/0216094 | A1* | 10/2004 | Bosworth | G06F 9/4488 717/141 |
| 2005/0015358 | A1* | 1/2005 | Min | G06F 17/2217 |
| 2005/0188353 | A1* | 8/2005 | Hasson | G06F 8/70 717/116 |
| 2006/0053131 | A1* | 3/2006 | Meijer | G06F 8/31 |
| 2007/0038978 | A1* | 2/2007 | Meijer | G06F 8/437 717/106 |
| 2007/0055964 | A1* | 3/2007 | Mirkazemi | G06F 8/24 717/140 |
| 2008/0059875 | A1* | 3/2008 | Ishizaki | G06F 17/2223 715/256 |
| 2008/0178149 | A1* | 7/2008 | Peterson | G06F 8/437 717/110 |
| 2008/0282238 | A1* | 11/2008 | Meijer | G06F 8/437 717/162 |
| 2010/0153930 | A1* | 6/2010 | Lambert | G06F 9/45508 717/139 |
| 2011/0179402 | A1* | 7/2011 | Buckley | G06F 8/43 717/140 |
| 2012/0180025 | A1* | 7/2012 | Webb | G06F 8/30 717/114 |
| 2012/0216077 | A1* | 8/2012 | Christensen | G06F 11/3612 714/38.1 |
| 2012/0311546 | A1* | 12/2012 | Fanning | G06F 8/75 717/136 |
| 2013/0346274 | A1* | 12/2013 | Ferdinand | G06Q 40/04 705/37 |
| 2014/0040860 | A1* | 2/2014 | Darcy | G06F 8/437 717/114 |
| 2014/0109106 | A1* | 4/2014 | Fanning | G06F 8/433 718/106 |
| 2014/0157243 | A1* | 6/2014 | Vargas | G06F 8/51 717/137 |
| 2014/0282442 | A1* | 9/2014 | Hoban | G06F 8/437 717/143 |
| 2015/0058830 | A1* | 2/2015 | Verlaguet | G06F 9/3846 717/136 |
| 2015/0205601 | A1* | 7/2015 | Chen | G06F 9/44521 717/163 |

OTHER PUBLICATIONS

Gray, K., Safe Cross-Language Inheritance, Proceedings of the 22nd European conference on Object-Oriented Programming, Jul. 7-11, 2008, 25 pages, [retrieved on Mar. 16, 2018], Retrieved from the Internet: <URL:https://pdfs.semanticscholar.org/02f1/9f847ccef4d3d12a31b5e3606cb3f1490abd.pdf>.*

Ishizaki, K., et al., Adding dynamically-typed language support to a statically-typed language compiler, Proceedings of the 8th ACM SIGPLAN/SIGOPS conference on Virtual Execution Environments, 2012, pp. 169-180, [retrieved on Aug. 9, 2016], Retrieved from the Internet: <URL:http://dl.acm.org/>.*

Ortin, F., et al., Including both static and dynamic typing in the same programming language, IET Software, vol. 4, Issue: 4, Aug. 2010, pp. 268-282, [retrieved on Jan. 5, 2019], Retrieved from the Internet: <URL:http://ieeexplore.ieee.org/>.*

* cited by examiner

100

SAFELY CONSUMING DYNAMICALLY-TYPED CODE FROM A STATICALLY-TYPED PROGRAMMING LANGUAGE

This application claims the benefit of U.S. Provisional Application No. 62/081,113, filed on Nov. 18, 2014, and U.S. Provisional Application No. 62/187,038 filed on Jun. 30, 2015.

TECHNICAL FIELD

The embodiments herein relate to enabling a statically-typed programming language to safely consume dynamically-typed code.

BACKGROUND

A "data type" or simply "type" in computer programs is a classification identifying one of various types of data, such as integer or Boolean, that determines the possible values for that type; the operations that can be done on values of that type; the meaning of the data; and the way values of that type can be stored. An example of a type would be an "int", which, in C-like languages, typically represents a signed 32-bit integer. As such, an "int" would not be able to hold text values. If it did, it would violate fundamental assumptions made by the program and compiler. For example, an "int" would typically allow the subtraction operation, and text values may not support such a subtraction operation. Therefore, types and data have to be checked to ensure they conform to the "rules" of the programming language in a process known as "type checking."

Static type checking is a form of type checking which occurs at compile time. Therefore, while the program is being transformed from source code to its target by the compiler, it is also type checked. If the type checking fails, the compiler may reject the program and not transform the source code to its desired target.

In contrast, dynamic type checking occurs at runtime, or, in other words, during program execution. If a type check fails at runtime, the program may produce a runtime error and terminate. For complex and mission-critical applications, static type checking would be strongly preferred because there is certainty and predictability the program will not terminate due to a possible type error at runtime. Therefore, where stability and correctness are preferred or even needed, static type checking is the preferred option.

Further, a programming language which is "dynamically-typed" may not necessarily be dynamically type checked. For instance, type information may not be available until runtime (dynamic typing), but if type incompatibilities occur at runtime, the program may choose to silently resolve the error and continue (meaning it is not dynamically type-checked). Some programming languages may perform no type checking or limited type checking.

For example, the JavaScript language will throw a runtime TypeError when trying to call a numeric literal as a function like so (but only once it's encountered at runtime): 2( );

Meanwhile, operations on seemingly incompatible types will silently succeed or fail:
  1+"1"=="11" // addition of number and string
  1+"a"=="1a" // addition of number and string
  1−"a"==NaN // IEEE 754 NaN ("Not a Number") type This behavior is very unintuitive to most programmers, and lack of type checking can make writing robust applications very difficult. For applications with large code bases, it becomes cumbersome and nearly impossible to find, analyze, or anticipate potential runtime type errors, which can cause the application to crash or behave unexpectedly. For a language like JavaScript, which powers most of the modern websites, this is not a desirable situation.

Type safety is the extent to which a programming language or compiler discourages or prevents type errors. Aforementioned examples also illustrate the concept of "type safety", or the lack thereof. As illustrated, JavaScript is not type safe.

Microsoft's "TypeScript" programming language provides means to interoperate with JavaScript, but suffers from an inelegant, unintuitive design which hampers programmer productivity. For example, Microsoft's TypeScript requires developers to manually provide type annotations for JavaScript code and libraries. For larger libraries, this could consume many months of developer effort. Furthermore, the correctness of these type annotations are not verified, and, in some cases, they can be very difficult to verify.

The "Roy" programming language by Brian McKenna can also interoperate with JavaScript. In "Roy", it is assumed that an unknown identifier refers to a native JavaScript global. This method suffers from being unable to distinguish between a variable declared from JavaScript, a variable that was not declared inside the compatible programming language (in this case, inside Roy), and a variable that was not declared at all (in this case, in either Roy or JavaScript). This can lead to a program with unexpected and unpredictable behaviors.

BRIEF DESCRIPTION OF THE FIGURES

The embodiments herein will be better understood from the following detailed description with reference to the drawings, in which.

DETAILED DESCRIPTION OF EMBODIMENTS

Figure 1:
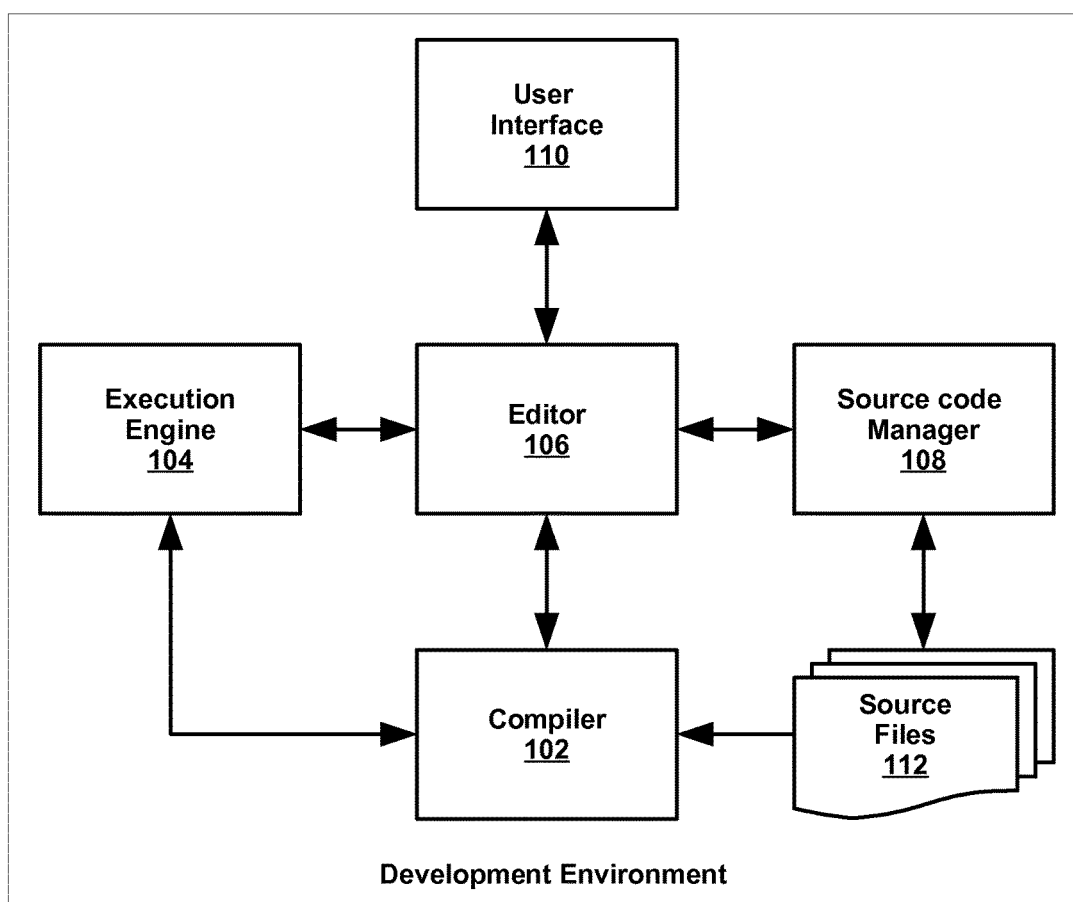
FIG. 1 illustrates an example development environment (DE) on a system for consuming dynamically-typed code in a statically-typed programming language.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose mechanisms to consume a dynamically-typed language in a compatible language, and to compile source code in a compatible language into a target language to add "eventual type safety" and static type checking to a superset of a dynamically-typed language, irrespective of whether the dynamically-typed language is dynamically type-checked or not.

The example embodiments use a language that is statically-typed and compatible (referred to as "compatible language", "statically-typed language", "statically-typed programming language", or "internal language") with a dynamically-typed programming language (referred to as "external language", "dynamically-typed language", "dynamically-typed programming language", or "dynamic language") such as JavaScript, unless otherwise specified. However, the embodiments herein may be used to consume any dynamically-typed language. For example, the invention can be used to build a language on top of (and/or compatible with) PHP.

In a preferred embodiment, all types (which may include, by way of non-limiting example: variables, constants, classes, functions/methods, fields, declarations, objects, literals, expressions, and/or data) of the external language are unified into a single type. In the case where the dynamic language is JavaScript, JavaScript types (including, but not limited to: string, boolean, object, function, undefined, and number) are unified into a single type at compile time.

This unified type is known as the "unified type", "unified external type", or also the "external type." Types or data that are unified into the "external type" may also be referred to as "externals." All types (which may also include, by way of non-limiting example: variables, constants, classes, functions/methods, fields, declarations, types, objects, literals, expressions, and/or data) of the compatible language may be referred to as "internal types" or "internals", although they are not necessarily unified.

In a preferred embodiment, symbols having the type of the unified external type need to be declared, either with a declaration that declares an identifier as being defined in the dynamically-typed language (e.g. an "imported external"), or a variable or function declaration in the internal language that declares an internal variable with the type being the unified external type or a function with the return type being the unified external type, respectively.

In a preferred embodiment, the identifiers that belong to the unified external type will not be "name mangled" by the compiler. Further, in various embodiments, a keyword may be provided for identifying the identifiers or symbols that should not have their names mangled.

In a preferred embodiment, the compatible language will treat all externals as one type (e.g. via compile-time merging rules, replacements, conversions, or coercions). An external type can be "unified" at compile time for type checking, and its type may again change at runtime.

When the statically-typed compatible programming language is a nominally-typed programming language, the unified external type is represented with a single name or keyword. A modifier such as "external" can also be used to modify variable declarations, constant declarations, function declarations, function expressions, method declarations, and classes as having the unified external type.

In various embodiments, merging of types or compile-time conversions of external types to corresponding unified external types may happen at compile time. For example, an array type merged with a unified external type or converted to the unified external type, may only affect how the type checker checks the types at compile time, and may not have an effect in the generated code. Further, the "conversion" at compile time can be a rule for the type checker or logic that is hard-coded into the type checker. It will be understood by one skilled in the art that replacements, temporary conversions, and many other approaches may be used to arrive at how type-checker can perform checks for types at compile-time.

In some embodiments, the "external" modifier can be used to convert variable declarations, function declarations, function expressions, method declarations, and classes into the unified external type.

In some embodiments, more than one unified external type can be allowed, each unified external type being specific to a group or class of types. For example, there can be different unified external types to unify reference types, void types (e.g. undefined and null), object types (e.g. JavaScript "Object"), numeric types (e.g. integer types or floating-point types), class types, function types, and textual types (e.g. "string" and "char"). In other example embodiments, a unified external type may be defined for all reference types, and another unified external type may be defined for all primitive (built-in) data types. An implementation (compiler, interpreter, language standard, etc) can define or implement the primitive type conversions to and from the unified external type. Similarly, implementation-defined reference types (e.g. primitive wrapper classes for a standard library) can have conversions to and from the unified external type defined by the implementation.

Conversions can be either implicit or explicit. Implicit conversions are those that do not require specific instructions or annotations for conversions to be performed, and happen automatically upon assignment. Explicit conversions are those that require a specific conversion mechanism to perform the relevant conversion. Conversions may be inserted into the generated code and are not necessarily a mechanism restricted to compile time like the unification of external types.

Further, conversions can be either implementation-defined or user-defined. Implementation-defined conversions are specific to the implementation (for example, compiler, interpreter, language standard, etc.). Conversions may be specifically defined by programmers (also referred to as user-defined conversions) for classes and types they create. The user-defined conversions can be conversions TO the unified external type and FROM the unified external type. User-defined conversions may be provided by programmers in various forms including, but not limited to: classes, functions, configuration files, code, procedures, charts, diagrams, or a combination thereof.

In a preferred embodiment, an implicit conversion is performed for commonly-used types, such as the compatible language's primitive (built-in) data types ("int", "string", etc.), from and to the unified external type. For example, if an "external" is assigned to an internal "string", the value or data of the external will be converted to a value of type string without the programmer needing to explicitly tell the compiler to insert the instruction into the compiled code or having to explicitly add a command (such as an explicit type cast). Similarly, an internal "string" can be automatically converted to its external equivalent without any explicit instructions if the "string" gets assigned to a variable having the unified external type.

In a type system where a primitive type may have a corresponding reference type (e.g. in Java, the primitive type "int" has the corresponding wrapper class "Integer"), a matching wrapper class may be provided. If the wrapper class provides a conversion to the unified external type, the same conversion applies to the corresponding primitive type. Likewise, if the wrapper class provides a conversion from the unified external type, the same conversion applies to the corresponding primitive type.

A class with an implicit conversion to or from external can deal with externals without any explicit type conversions. It may not always be desired for a class to be implicitly converted to or from external though, and the implicit conversion can be omitted with just an explicit conversion available. Furthermore, classes may have no possible conversions to/from external (neither implicit nor explicit) or both possible conversions (both implicit and explicit).

In a preferred embodiment, by default, there would be no conversions to/from external for classes in the compatible language. However, user-defined conversions to or from external make it possible for the user to apply custom logic when converting to/from external. For example, a polygon class may have no external equivalent, while a signed 32-bit integer stack may define an implicit conversion from external that checks, at runtime, all the types of an incoming external array's elements to make sure they are signed 32-bit integers (and not, for example, strings, which might result in a runtime error originating from the implicit conversion logic/function). Therefore, user-defined conversions can also act as "gatekeepers" between the external language and compatible language.

In a preferred embodiment, user-defined types (e.g. classes) may not have an implicit and/or explicit conversion to the unified external type by default. User-defined conversions may be used for converting user-defined classes. User-defined conversions for user-defined types (e.g. a class), subtypes (e.g. subclasses) may not inherit the user-defined conversion. Further, for generic user-defined types (e.g. a generic class), runtime reflection or a similar mechanism (e.g. mirrors) can be used for performing conversions.

In a preferred embodiment, in converting an internal reference type to the unified external type, the internal reference type is "made safe" before converting by using various mechanisms including, but not limited to: inserting deep cloning instruction(s) into the generated code, inserting a conversion to a compatible type in the generated code, using a compile-time notification (e.g. warning), or inserting runtime checks into the generated code.

A unified external type can convert to and from another unified external type during compile-time type checking regardless of whether their actual runtime types will conflict.

In various embodiments, a user-defined conversion function may be defined to convert types of the statically-typed programming language to the unified external type or to convert from the unified external type to the types of the statically-typed programming language.

Any variable that can hold more than one type of data at runtime can be treated as being unified into a single type at compile time. In the example embodiment where the external language is JavaScript, the types that can be unified include all the types of JavaScript, including but not limited to: "string", "number", "boolean", "object", "function", and "undefined"; all DOM (Document Object Model) API types; and ECMAScript "host object" types.

In some embodiments, all types of the external language are deemed to be represented by the "external" type. In some other embodiments, only a pre-defined list of types may be represented by the "external" type. The pre-defined list of types may be configurable, for example, by using a configuration file. Further, in some embodiments, the "external" unified type may not represent other types that allow holding values of more than one type. And, in some other embodiments, the "external" unified type can represent other types that allow holding values of more than one type.

In some embodiments, the dynamically-typed programming language may not be able to access the types of the statically-typed compatible programming language. In some other embodiments, the dynamically-typed programming language may be able to access the types of the statically-typed compatible programming language.

The statically-typed programming language may provide a way to cast types from the types of the statically-typed programming language to the unified external type, from the types of the dynamically-typed programming language to the unified external type, from the unified external type to the unified external type, and from types of dynamically-typed programming language to the statically-typed programming language via type casting.

In a preferred embodiment, when the compatible programming language compiles to the external language, the external language target code will not have the unified external type at runtime but may have several possible runtime types.

In a preferred embodiment, when a symbol is encountered that has the unified external type, its properties, elements, and children will be bypassed and not be checked during compilation. Further, an operation (e.g. statement or expression) can be forbidden if the unified external type occurs within the operation. This may be achieved through a compile-time error or warning, or through a runtime error, warning or exception. For example, for operations involving objects, arrays, classes, and other reference types, an access operation can stop checking properties at compile time as soon as the object, array, class, reference type, or property having the unified external type is encountered with the dot accessor ("." syntax in JavaScript).

Further, in various embodiments, runtime mechanisms, and runtime errors may be inserted into the generated code.

Runtime mechanisms may be runtime conversions, runtime checks, or a combination of runtime conversions and runtime checks. Certain runtime mechanisms may include a combination of conversions and checks, with conversions being prioritized over checks. Certain other runtime mechanisms may include runtime conversions and runtime checks such that the runtime checks are performed only when the runtime conversions fail or cannot happen. Further, in certain other runtime mechanisms, runtime checks to check if a conversion is available or not may be given high priority compared to one or more runtime conversions. In a preferred embodiment, compile-time checks have priority over runtime conversions.

In a preferred embodiment, the following can be the order of priority for checks and conversions:
1) Compile-time Type Check
2) Runtime Conversion
3) Runtime Check A runtime conversion may have higher priority over a runtime check (e.g. a runtime type check). If no conversion exists, a runtime check can be the "fall back". This makes for a much smoother development process for the programmer because, with runtime checks alone, the programmer has to do additional testing (e.g. to make sure types or all possible inputs are correct). Furthermore, it introduces more possible points of failure. However, conversions ensure that the generated code is type safe and eliminate the need for additional testing.

Alternatively, it is claimed that a runtime check can be used to check if a runtime conversion is available. In this case, the runtime conversion will follow the runtime check.

During runtime, a runtime error or exception may occur when a runtime check fails. Runtime errors inserted may include information such as original source line number, column number, file path, and other relevant data from the original source file.

Examples of runtime checks include, but are not limited to: checks for asserting that the callee is a function type at runtime; checks for asserting what is being instantiated is indeed instantiable at runtime for instantiation operations; checks for asserting that parent(s) or ancestor(s) of one or more properties are of the correct runtime type (for example, JavaScript object, function, class, or array) for operations involving accessing object properties; checks for testing what is being thrown can be a valid exception for a throw statement or operation; and checks for asserting if an iteration or loop is possible for an iteration operation.

In various embodiments, runtime operations such as function calls and instantiations may be cached before performing runtime checks or conversions to avoid unexpected side effects. Further, objects may also be cached before performing checks or conversions to avoid unexpected side effects. The cached or "memoized" result may be inserted into the generated code instead of executing a function call or accessing an object property more than once.

In a preferred embodiment, dynamic code evaluations (e.g. "eval" or "new Function( . . . )" in JavaScript) can be restricted or rejected. This may be achieved by way of inserting runtime assertions, conversions, and modifications. In various embodiments, the rejection of dynamic code evaluation may be in various forms including but not limited to: a compiler error, a compiler warning, a runtime error inserted into the generated code, a modification inserted into the generated code (e.g. silent deletion or conversion of the dynamic code evaluation mechanism). In some embodiments, dynamic code evaluation may not be allowed for external declarations. Also, certain mechanisms of dynamic code evaluation may not be allowed.

In a preferred embodiment, runtime types and compile-time types are differentiated during compilation. For example, a runtime "string" type need not be same as a compile-time "string" type.

After compilation, the unified external type can be discarded at runtime and the symbols having the type of the unified external type can be any one of the possible runtime types of target language.

Embodiments herein further allow importing or loading of external symbols/identifiers/declarations where the imported importable (file, module, class, data, etc.) consists of at least 50% declarations having the unified external type or declarations for identifiers being defined in the external language. An importable can be, but is not limited to: JavaScript/ECMAScript language (and its objects, classes, and symbols), web browser DOM (Document Object Model) API, frontend API or library (e.g. jQuery), backend API or library (e.g. Node.js API), or a combination thereof. In various embodiments, the importables are implementation-specific (e.g. compiler or standard library).

Referring now to the drawings, and more particularly to FIGS. 1 through 9, where similar reference characters denote corresponding features consistently throughout the figures, there are shown embodiments.

FIG. 1 illustrates an example development environment (DE) on a system for consuming dynamically-typed code in a statically-typed programming language. The DE may reside partially and completely on one or more computers such as the one illustrated in FIG. 9.

In an example embodiment, the DE may be part of an Integrated Development Environment (IDE) used by programmers for development. In other embodiments, the DE may also be enabled as a plugin in other IDEs such as ECLIPSE.

The DE includes a compiler to compile statically-typed code to a dynamically-typed target language (or any other target language) and other standard DE modules such as a user interface for rendering visual interface for editing code and managing code, an editor for allowing programmers to edit source code, an execution engine for runtime execution of compiled code, a source code manager to enable programmers to manage source code files, and a source files module to store and retrieve source files.

Figure 2:
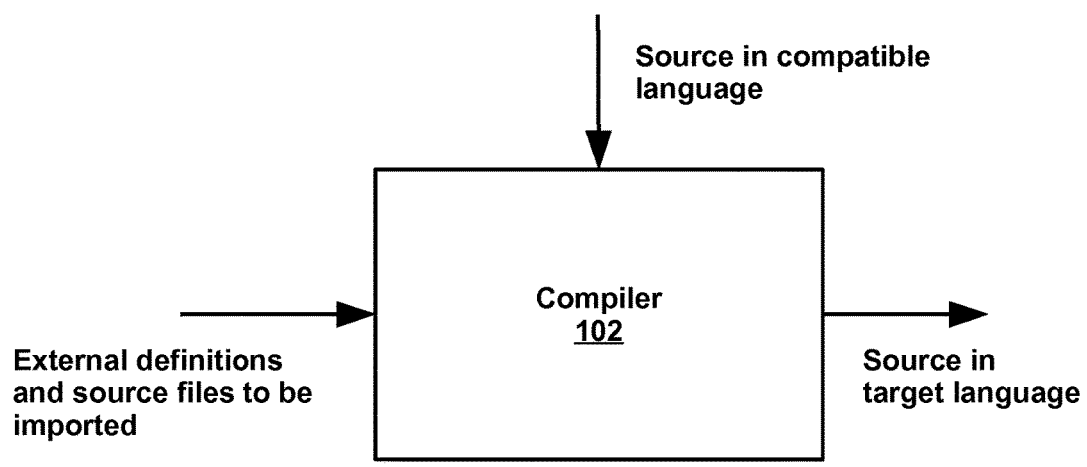
FIG. 2 and FIG. 3 illustrate an example embodiment of a compiler for compiling source code in a compatible language to a target language, including any importable source files or external declarations.
Figure 3:
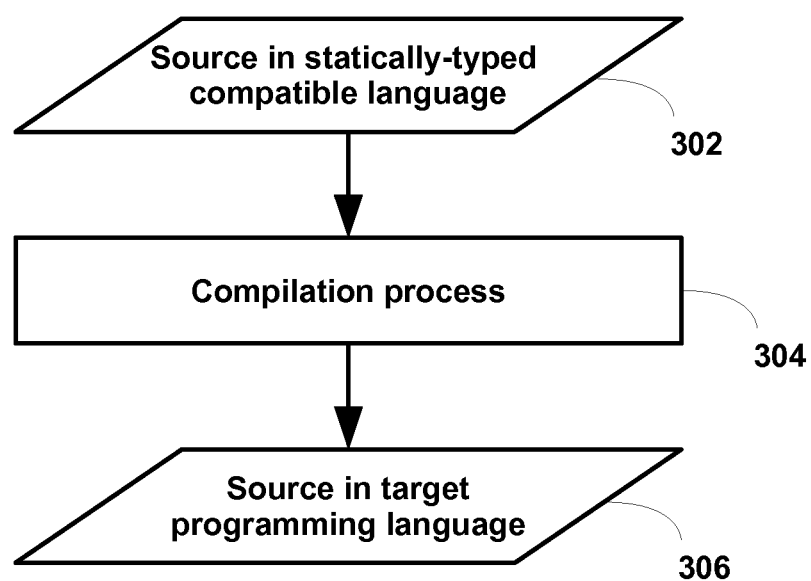

FIG. 2 and FIG. 3 illustrate an example embodiment of a compiler for compiling source code in a compatible language to a target language, including any importable source files or external declarations. The target language may be the external language that the compatible language consumes or a different language. In an example, the compiler compiles source code in a hypothetical statically-typed programming language, JS++(JavaScript++), which is a superset of and consumes dynamically-typed JavaScript (JS) code along with any definitions to the external language (JS). In such an example, programmers may use the methods described herein to enable static type checking for a language built on top of the dynamically-typed JS programming language.

Figure 4:
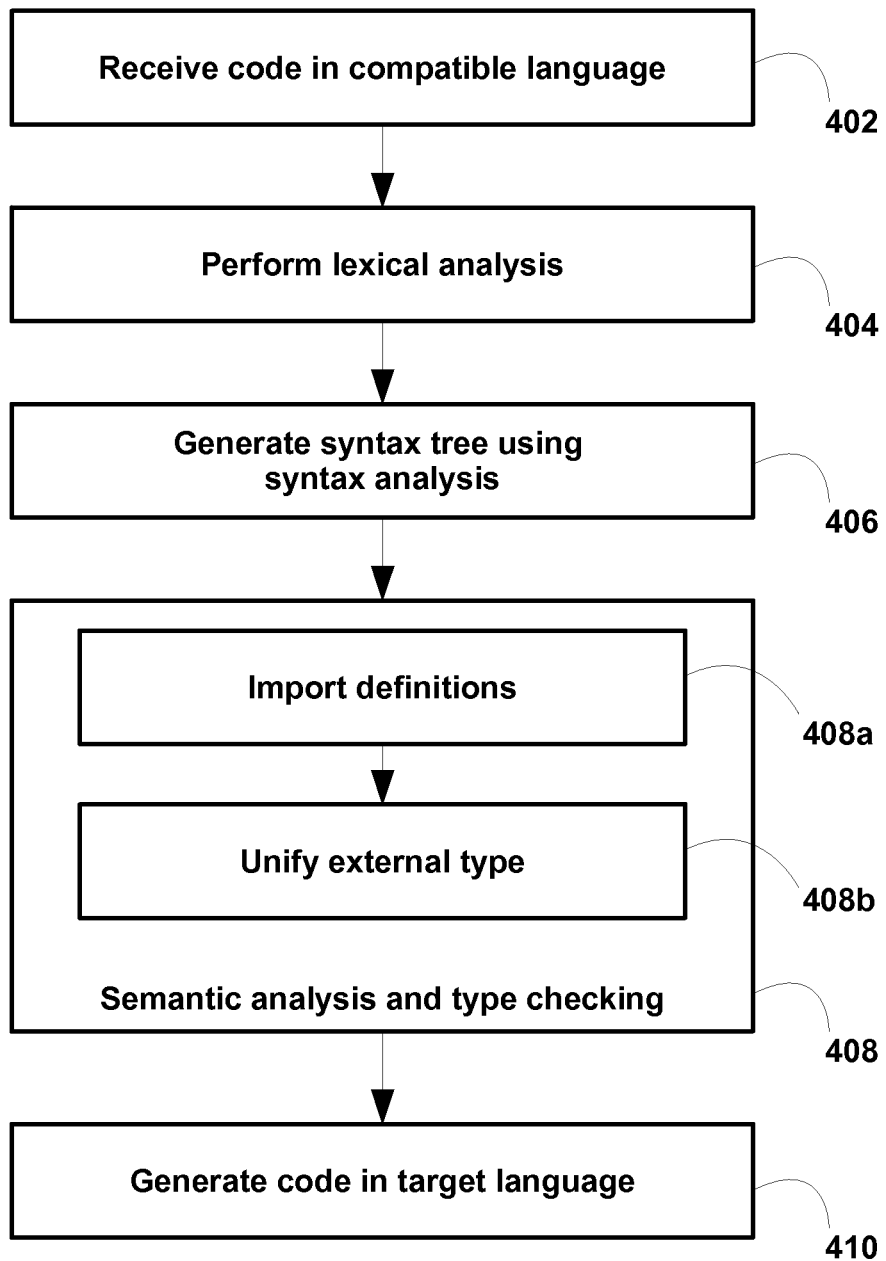
FIG. 4 illustrates an example of a method for compiling source code in compatible language to target language.

FIG. 4 illustrates an example of a method for compiling source code in compatible language to target language. The compatible source may include imports and references to source code in external language. At 402 a compiler receives code in compatible language. The compiler performs (404) lexical analysis and generates (406) syntax tree using syntactic analysis. The compiler further performs semantic analysis and type checking (408). During semantic analysis and/or type checking, each expression, statement, data, and symbol has its type determined. When operations occur with incompatible types, an error will be generated to inform the programmer that her program may crash due to incompatible types. Since the types for dynamically-typed operations may not be known until runtime, the invention will combine all the types of the dynamically-typed code into a single unified external type. The unified external type allows the type checker to soundly reason about a dynamically-typed language and statically-typed language together, without needing to know the runtime type for an operation. At 408, the compiler may further import (408a) definitions including, but not limited to: declarations, external declarations, definitions, assignments, source code, and conversion functions, classes and configurations. The compiler may further unify (408b) external types before performing semantic analysis/type checking or during semantic analysis/type checking. The compiler then generates code in target language (410). The generated code may include conversions. For instance, if a variable was declared as having the unified external type at compile time, and there was an implicit conversion on assignment to a string type, the conversion from the unified external type to the string type will be inserted at code generation. Conversion instructions for user-defined and implementation-defined conversions to/from the unified external type may be generated at this stage.

The various actions in method 400 may be performed in the order presented, in a different order or simultaneously. Further, in some embodiments, some actions listed in FIG. 4 may be omitted.

The following examples and related descriptions explain the foregoing in further detail.

Declaring Externals

Figure 5:
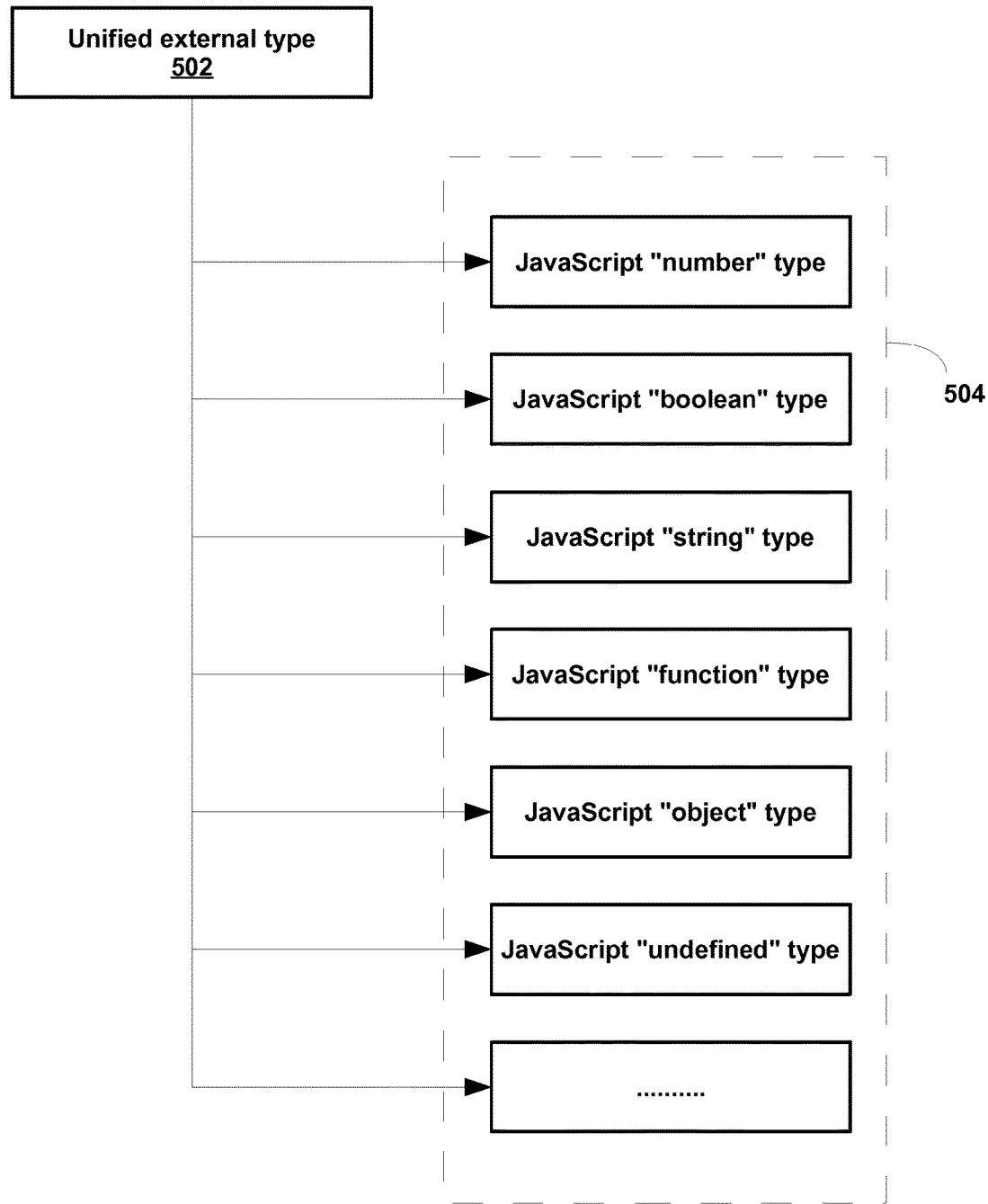
FIG. 5 provides a graphical representation of a unified external type 502 unifying a list of various types provided in JavaScript.

In a preferred embodiment, all types (which may include, by way of non-limiting example: variables, constants, classes, functions/methods, fields, declarations, objects, literals, expressions, and/or data) of the external language are unified into a single type. FIG. 5 provides a graphical representation of a unified external type 502 unifying a list of various types 504 provided in JavaScript, as a non-limiting example.

By way of example, we can declare externals in different ways. The first is an identifier declared to be external, possibly using a keyword like "external". In the following example, we declare the identifiers "jQuery" and "$" (dollar sign) to be of type external. Therefore, whenever the compiler encounters these identifiers, it may skip certain checks or may apply special rules.

external jQuery, $; Another way to declare an external is a variable or function declaration which is in the compatible language but has an external type.

```
var foo = 1; // has external type
int bar = 2; // has internal type
function baz( ) { ... } // has external return type
int qux( ) { ... } // has internal return type
```

In the examples, the variables with an external type are declared with "var" and functions with an external return type are declared with "function". It is assumed for the rest of the pseudo-code in this document that variable declarations using the "var" keyword will create a variable with an external type, and function declarations using the "function" keyword will declare a function with an external return type (and the function itself can also be external).

Both kinds of externals in the last two pseudo-codes declare symbols as being of type "external". However, the first kind may be seen as "importing" symbols from the external language, while the latter kind may be seen as providing a mechanism for the compatible language to easily be able to work with the types of the external language.

In a preferred embodiment, externals would have to be declared. Now, considering the following example:

```
external require;
external httpModule = require("http");
```

Since we had to call the "require" function for the HTTP module, we would have to declare "require" first. This will ensure that typos don't slip through as false positives. In the preceding example, "require" is declared as being "external" (unified external type). This will enable making calls to "require" function and assign it to a new external ("httpModule"). The types will match at compile time because calls to an external ("require") will return external, and the type for "httpModule" was declared as external.

An external declaration declares an identifier as having the unified external type and that it will not be "mangled" by the compiler. For example, compilers may compile the identifiers "foo", "bar", and "baz" to "a", "b", and "c", respectively. This process is known as "name mangling", where the identifiers in a source language are compiled to different identifiers in a target language.

In some embodiments, specific identifiers may be declared as specifically not being mangled. In some other embodiments, some (or all) of the identifiers that are declared as being external may not be mangled and therefore bypassed.

In a preferred embodiment, all identifiers declared as being part of the dynamically-typed language will be automatically not mangled. Furthermore, a keyword can be provided in the statically-typed programming language to identify the identifiers that should be bypassed for name mangling.

Encountering External Identifier and Property Analysis

When we encounter an identifier or symbol of type "external", we may skip property checks.

For objects, arrays, classes, and other reference types, when an external is encountered, checking properties at compile may be stopped after the dot accessor. For example:

```
external foo;
foo.bar = 1;
```

In the above code, the compiler will not check for the existence of property "bar", it will not check the type of property "bar", and so on. Likewise, in the following code:

```
external foo;
foo.bar.baz = 1;
```

In the preceding example, the compiler will not analyze the property "bar"; therefore, it will never analyze properties of "bar" (in this case, it has a property "baz"). In another example:

```
class Foo
{
    public static var bar = /* ... */;
}
```

The member "bar" (of the class "Foo") in the preceding example is external. Therefore, in the following code:

Foo.bar.baz.qux;

"Foo" will be analyzed by the compiler in the preceding example. It is a class and it has members. One of those members is "bar". The compiler analyzes "bar" and sees that it has the external type. The compiler then stops analyzing. It does not analyze to check if "baz" is a member of "bar", and therefore it will not descend into "baz" and check that "qux" is a member of "baz".

Now, consider the following example:

```
external $;
$("#mydiv").hide( );
```

The return type for "$" after it's called as a function is not known. Further, it is not known whether what will be returned after the function call will have a property, method, or field named "hide". Therefore, runtime checks can be inserted to check to that if there is a callable function or method before we call it. Furthermore, checks can be inserted at runtime to check for the existence of properties, fields, and methods.

Importing External Declarations

Mechanisms herein enable importing externals. Importing of externals can happen by way of importing classes, modules, functions, files, data, or any importable entity which, as a single importable entity, are majority (over 50%) composed of declarations or definitions having the unified external type.

By way of non-limiting example, the importable external declarations may be for A) JavaScript/ECMAScript language, B) jQuery library, C) web browser DOM (Document Object Model), and D) Node.js API. Importable declarations and definitions may be distinct importables (an "importable" can be a file, module, etc.) depending on the language or library, or may be combined logically. For example, the JavaScript/ECMAScript externals can be combined with the web browser DOM externals into a single importable (file, module, etc).

Preferably, a language author can define externals in advance and a programmer can import them for use. Further, the programmer can also create her own external declarations that can be imported. This helps the programmer (a) by preventing her from having to re-define common externals, (b) increasing re-usability because third-party external definitions can be downloaded for re-use, and (c) allowing the programmer to "organize" externals, especially in large projects where the increased code complexity calls for better organization.

For example, using a file called "imports.jspp" which lists the identifiers "Foo", "Bar", and "Baz" as externals, a programmer can import "imports.jspp" in another file ("NewFile.jspp"). Whenever the variables "Foo", "Bar", and "Baz" are used in the program, they will be treated as externals in "NewFile.jspp".

Converting Unified External Type to/from Integer Types

The unified external type is a compile-time type to reason about the types of a dynamically-typed programming language more easily. However, at runtime, anything declared with the unified external type will have its own respective runtime type. For example, a variable declared with the unified external type will be treated as having the unified external type during compile-time type checking, but, when the program is being run, it may have any type such as 'string' or 'int'.

In an embodiment, when converting from unified external type that is a 'string' type at the time when conversion is needed, and the string value is not a string representation of a real number (1, 2, 3, 3.4, 5.77, −300, 3.99999999, and so on . . . ) or IEEE 754 single/double floating-point value, the value is converted to zero (0). For example, an external with string value "abc" that is trying to be assigned to an integer type will be converted to zero (0). This makes it seamless to use integer types. While the programmer may "guess" the type correctly for an external most of the time, adaptions such as this can help catch edge cases where the programmer's guess was inaccurate.

Additionally, when converting from the unified external type that is object, function, class, module, array, set, hash, dictionary, or a reference type at the time when conversion is needed, the value is converted to zero (0). If there was an unintended conversion, it would have been as a consequence of a logical error from the programmer, and not a type error or compiler error.

Furthermore, when converting from the unified external type to an integer type, "wrapping" will occur. For example, an unsigned 8-bit integer may range from 0 to 255 in possible integer values. Due to the highly dynamic nature of external code, it's possible that the value 256 may have to fit into the 8-bit unsigned integer. In other words, the value will be out of range. When the value is out of range, it will "wrap around."

Therefore, with a range of 0 to 255, an out-of-range integer 256 will wrap to 0, 257 will wrap to 1, 258 will wrap to 2, and so on. On the other end of the spectrum, −1 will wrap to 255, −2 will wrap to 254, and so on. Without these mechanisms, we may have to use just a single number type (e.g. Microsoft TypeScript) to represent all integers and floating-point numbers (based on IEEE 754 floating point standard), which may prevent even doing basic math reliably.

Both signed and unsigned 8-, 16-, 32-, and 64-bit integers (and the corresponding wrapper classes for these primitive types) can be converted to and from the unified external type via a conversion function. Alternatively, the conversion can also happen via auto-boxing (both boxing and unboxing).

In some instances, a loss of precision or data might occur when converting from an internal to an external type. For example, in JS++, which allows the "float" (32-bit floating point values), "long" (signed 64-bit integer), and "unsigned long" (unsigned 64-bit integer) types, if the JS++ value is sent to JavaScript, which does not support numbers in these ranges, precision may be lost. In some embodiments, a warning can be raised by the compiler to provide hints for the programmer if runtime errors occur due to data/precision loss. In some other embodiments, an error can be raised by the compiler to prevent such operations.

Consuming Javascript

The JS++ language would be a superset of the existing JavaScript language.

It may be desirable to add function/method overloading on top of a language that does not natively support compile-time function/method overloading. For example, in JavaScript:

```
function foo( ) { ... }
function bar(a, b, c) { ... }
```

In the above example, the function "foo" should take no arguments, and the function "bar" should take three arguments for: a, b, and c. However, in actual practice, any function defined in JavaScript can take an arbitrary number of arguments, and they can then be accessed from within the function using the "arguments" object, which is an array-like JavaScript object.

This situation creates difficulties when trying to implement compile-time overloading. One solution is to require arguments for calls to the function to match the signature(s) exactly. For example, a function taking exactly two parameters cannot be called with three arguments.

However, if a language is building on top of the existing JavaScript syntax and wants to be compatible with JavaScript, it would be more desirable for JavaScript functions to retain their behavior. Therefore, it may be desirable for any function falling under the definition of an external function or a function having a return type that is "external" to retain its behavior (including, but not limited to, defining an "arguments" object inside the function). Meanwhile, all internal functions and methods can be overloaded.

Alternatively, all internal functions and methods can be overloaded, and all external functions and methods can be compiled with multiple dispatch. In yet another embodiment, when an internal function with an external return type is encountered, treat it like an internal function (with the same overloading rules and semantics).

External to External

The beauty of unifying all externals into one type is that we can write entire programs with just external types and without internal types. In this way, we are able to build the compatible language as a superset of the external language.

For example, for an external language like JavaScript, we can preserve all of its syntax, especially how variables and functions are declared:

```
var foo = "foo";
function bar( ) { }
```

In the superset language, like with JS++, we can preserve the above, and still add types such as the following:

```
var foo = "foo"; // JavaScript
function bar( ) { } // JavaScript
int baz = 1; // JS++
```

This creates a superset language that can be "eventually type safe".

Furthermore, when importing symbols from the external language, we can still send variables, functions, objects, callbacks, etc. back to the external language from the compatible language since the compatible language is able to work with external types, such as the following:

```
external someFunction;
var myData = getUserInput( );
someFunction(myData);
```

In the above example, a symbol from the external language "someFunction" is imported. And, there is a need to pass arguments to call "someFunction". Since all external types are unified into one at compile-time, the compiler is able to easily reason that the argument "myData" sent as an argument to the "myFunction" call is indeed compatible and valid. The "external" keyword may give us an external type, the "var" keyword may give us an "external" type. They are compatible. Compatibility ensures that there is no additional effort involved to make types work between the compatible language and external language. The compiler need not necessarily check if the runtime types will be compatible. It only needs to see the types as "external" at compile time, and check that "external" is compatible with "external".

In contrast, in existing methods such as Microsoft's TypeScript, the return type and types for each parameter for "myFunction" will have to be explicitly defined by the programmer. If "myFunction" changes its method signature, such as if the return type changes, or if any of the parameter types change, the programmer will either (a) lose type safety guarantees (with a possible silent failure), or (b) manually update the type definitions for "myFunction". For larger applications, such as applications with thousands of externals like "myFunction", such an effort can take many hours of manual and tedious labor, or, if the manual and tedious labor is not committed, the system becomes cumbersome and untrustworthy.

In various embodiments, if a function is defined with a return type being the unified external type, and the 'this' keyword is used inside the external function or function declared with external return type, the type of the 'this' keyword can be treated as external. Further, the 'arguments' object used in a function with external return type may be treated as either an array, object, or the unified external type. Furthermore, the function can take any amount of arguments, including fewer arguments than defined parameters and more arguments than defined parameters.

External to and from Internal

During code generation, instructions can be generated to convert to and from the unified external type. Conversions can be either implicit or explicit. Implicit conversions are those that do not require specific instructions or annotations for conversions to be performed, and happen automatically upon assignment. Explicit conversions are those that require a specific conversion mechanism to perform the relevant conversion. Conversions may be inserted into the generated code and are not necessarily a mechanism restricted to compile time like the unification of external types.

Figure 6A:
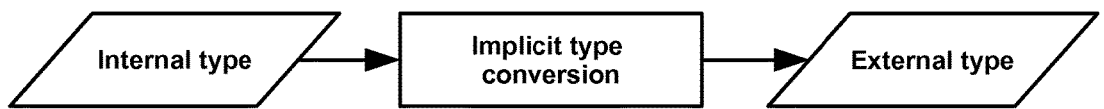
FIG. 6A illustrates an implicit conversion from an internal type to an external type.
Figure 6B:
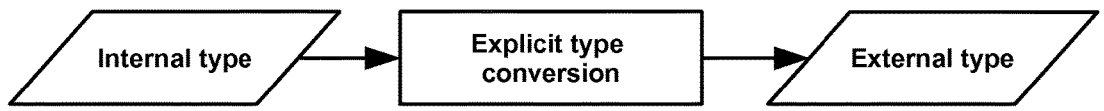
FIG. 6B illustrates an explicit conversion from an internal type to an external type.

FIGS. 6A and 6B illustrate conversions from an internal type to an external type. FIG. 6A illustrates an implicit conversion from an internal type to an external type. FIG. 6B illustrates an explicit conversion from an internal type to an external type.

Figure 7A:
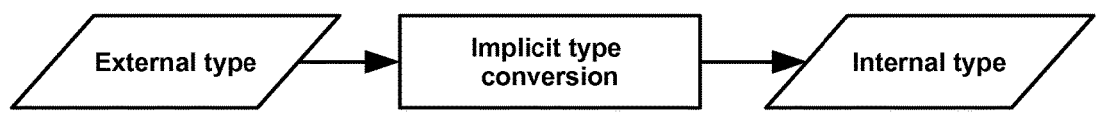
FIG. 7A illustrates an implicit conversion from an external type to an internal type.
Figure 7B:
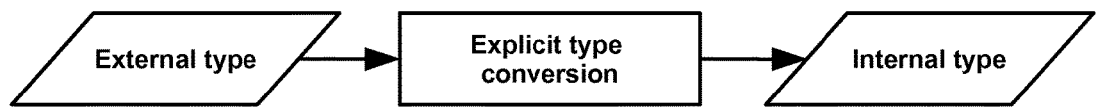
FIG. 7B illustrates an explicit conversion from an external type to an internal type.

FIGS. 7A and 7B illustrate conversions from an external type to an internal type. FIG. 7A illustrates an implicit conversion from an external type to an internal type. FIG. 7B illustrates an explicit conversion from an external type to an internal type.

Extending the previous example:

```
external someFunction;
var myData = getUserInput( );
int decremented = myData--;
someFunction(myData, decremented);
```

In the above example, an internal type is used ("int"—representing a signed 32-bit integer), and it has the identifier "decremented". Notice "decremented" involves an operation on an external, despite it being an internal. This is where implicit conversions from/to external can become involved. We can implicitly convert "myData" to a value compatible with the internal "int" type before we allow the decrement (--) operation. To illustrate what this might look like when compiled into JavaScript, here's some pseudo-code:

```
var myData = getUserInput( );
var decremented = (myData | 0)--;
someFunction(myData, decremented);
```

Note that the above could be JS++ compiled into JavaScript. Therefore, internal types of JS++ (such as "int") were not present. However, notice the bitwise operation (myData | 0) that would convert "myData" to a signed 32-bit integer. This illustrates how an implicit conversion may be compiled during code generation.

Furthermore, an explicit type conversion from "external" to "int" can be required before the decrement operation is allowed, as in the following example:

```
external someFunction;
var myData = getUserInput( );
```

```
int decremented = (int @ myData)--;
someFunction(myData, decremented);
```

The int @ myData is a type cast operation that casts "myData" from "external" to type "int".

Further, a runtime type check may also be inserted to check if the external type is compatible with the internal type. Likewise, a runtime type conversion may also be inserted to convert the external type to the internal type. When converting from internal to external, a runtime type check may be inserted to check if the internal is compatible with the external type (if we didn't already know at compile-time). When converting from internal to external, a runtime type conversion may be inserted to convert the internal type to the external type. All of this can be explicit or implicit, manual or automatic.

Figure 8:
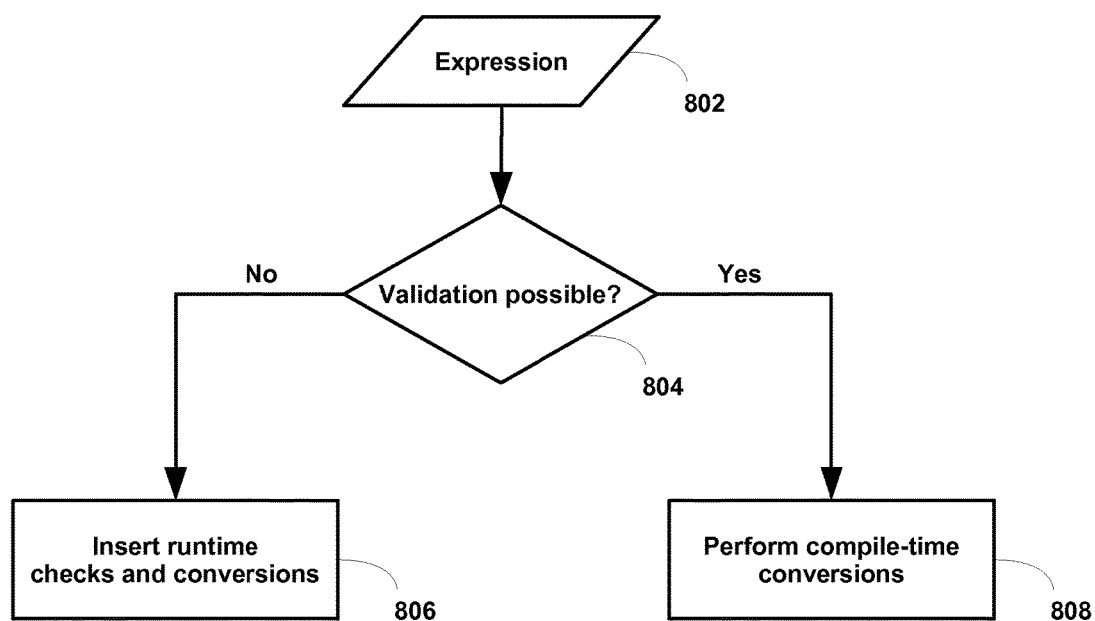
FIG. 8 illustrates an example flow where checks and conversions are inserted.

FIG. 8 illustrates an example flow where checks and conversions are inserted either at runtime or at compile-time for an expression depending on whether a validation of the expression is possible at compile-time or not. For a given expression 802, compile-time checks and conversions are inserted (808) when the expression can be validated (804) at compile-time. Else, runtime checks and conversions are inserted (806).

Generic Programming with Externals

Generics (parametric polymorphism) involves sending "type arguments" to a generic class. An "external" is a valid type argument. Furthermore, runtime reflection can be used, along with user-defined implicit/explicit conversions to/from external, to make generics work with external types.

In a unified type system, where everything inherits from a root "Object" class, "Object" could also accept externals as externals could inherit from "Object". To improve this further, "external" might be a primitive type, and its matching wrapper class might be "External" (note the capitalization). This is similar to how "int" (primitive type) and "Integer" (wrapper class) are different in JAVA.

The "external" type can be treated as a generic with its runtime type being the argument to its type parameter. The "external" type can have subtypes, including but not limited to the following:

external<void> ("void" unifies "null" and "undefined")
external<undefined>
external<null>
Object reference type. E.g.: external<Object>
Object primitive type. E.g. external<object>
external<Function> (function reference type)
external<function> (function primitive type)
external<String> (string reference type)
external<string> (string primitive type)
external<Boolean> (boolean reference type)
external<boolean> (boolean primitive type)
external<Number> (number reference type or IEEE-754 64-bit floating-point number reference type)
external<number> (number primitive type or IEEE-754 64-bit floating-point number primitive type)
Signed 8-bit integer reference type. E.g. external<SByte>
Signed 8-bit integer primitive type. E.g. external<sbyte>
Unsigned 8-bit integer reference type. E.g. external<Byte>
Unsigned 8-bit integer primitive type. E.g. external<byte>
Signed 16-bit integer reference type. E.g. external<Short>
Signed 16-bit integer primitive type. E.g. external<short>
Unsigned 16-bit integer reference type. E.g. external<UShort>
Unsigned 16-bit integer primitive type. E.g. external<ushort>
Signed 32-bit integer reference type. E.g. external<Integer>
Signed 32-bit integer primitive type. E.g. external<int>
Unsigned 32-bit integer reference type. E.g. external<UInteger>
Unsigned 32-bit integer primitive type. E.g. external<unit>
Signed 64-bit integer reference type. E.g. external<Long>
Signed 64-bit integer primitive type. E.g. external<long>
Unsigned 64-bit integer reference type. E.g. external<ULong>
Unsigned 64-bit integer primitive type. E.g. external<ulong>
32-bit floating point reference type. E.g. external<Float>
32-bit floating point primitive type. E.g. external<float>
64-bit floating point reference type. E.g. external<Double>
64-bit floating point primitive type. E.g. external<double>

Function and Method Overloading

With function overloading and method overloading, there may be instances where we want to disallow function and method overloading for functions that return an external type. This is especially useful when the target language uses different identifiers from the source language. For example, a variable "foo" in the original source language (such as JS++) may be compiled to "$a" in the target language (such as JavaScript).

Consider the following example written in a source language like JS++:

```
function foo( ) {
    return { bar: 1 };
}
```

The above JS++ code defines a function with an external return type and returns an external JavaScript object which can have properties dynamically added, modified, or deleted.

When the "foo" function is called, the following syntax may be used in the source language:
foo( );

If JS++ is compiled to JavaScript, the "foo" identifier may become:
$a( );

Therefore, assuming internal functions with an external return type are not treated like regular internal functions, the following can be achieved:

1) Any function that has a return type which is an external type can be prevented from being overloaded altogether.
2) Any function that has a return type which is an external type can have its overloading restricted so that all overloads of the function must also have a return type which is an external type.
3) Any function that has a return type which is an external type can be restricted from any overloading.
4) Any method that has a return type which is an external type can be prevented from being overloaded altogether.

5) Any method that has a return type which is an external type can have its overloading restricted so that all overloads of the method must also have a return type which is an external type.
6) Any method that has a return type which is an external type can be restricted from any overloading.

Type Casting

Since there may be multiple external types, it may be desirable to unify all the external types into one type for type casting. Therefore:

1) All external types can be unified into one type which can be used to cast any internal type to the unified external type.
2) All external types can be unified into one type which can be used to cast any external type to the unified external type.
3) When casting to the unified external type, runtime conversions can be inserted so a value of an internal type is appropriately converted to its external equivalent.
4) When casting to the unified external type, runtime conversions can be inserted so a value of an external type is appropriately converted.
5) When casting from the unified external type, runtime conversions can be inserted so a value of an external type is appropriately converted to its internal equivalent.
6) When casting from the unified external type, runtime conversions can be inserted so a value of an internal type is appropriately converted.
7) When casting to the unified external type, runtime checks can be inserted for type safety.

Further, user-defined conversion functions can also be supported in order to covert to and from the unified external type. A conversion function may not necessarily be associated with a class, and can be an independent function, such as the function in the following pseudo-code:

```
external convertIntToExternal(int x) {
    return makeExternal(x);
}
```

In the pseudo-code above, a function is declared with the "external" (unified external) return type. It takes as a parameter an int x. The pseudo-code then converts (via makeExternal) "x" from "int" to the unified external type.

Type Inference

Type inference can be used when variable or function/method declarations containing an external type are encountered in the source code. For example:

```
var foo = "a";
foo += "b";
string bar = foo;
```

In the pseudo-code, although declared to be of type "external", "foo" can be proven to always be of the "string" type. The only usage of "foo" is with "bar", which is also of the "string" type. Therefore, for the purposes of optimization and speed, the compiler may decide to forgo inserting runtime checks or conversions in this instance.

User-Defined Implicit and Explicit Conversions to/from External

Classes can define implicit and/or explicit conversions to/from external. Therefore, outside of primitive types which may be implemented by the language author(s), conversion rules can also be available for reference types (classes, interfaces, objects, class instances, etc.). This allows 100% of the type system to be covered with rules governing how they interact with externals.

By default, classes may not have either an implicit or explicit conversion to/from external available. This prevents user-defined classes from interacting with externals in unexpected ways.

The following pseudo-code is an example for defining implicit and explicit conversions to/from externals:

```
class StringArray
{
    // Array of reference types (instance of
System.String)
    private System.String[ ] data = [ ];
    // Implicit conversion from StringArray to external
    @ implicit external(StringArray list)
    {
        // Create a deep copy of the StringArray before
        // sending it out to external to prevent the
        // references (which are internal) from being
        // modified externally!
        return data.clone( );
    }
    // Implicit conversion from external to StringArray
    @ implicit StringArray(external ex)
    {
        // Confirm the external is at least an array
        assert(typeid ex == "Array");
        var ex2 = ex.clone( );
        // Loop through every element of the external
        // array to ensure they are strings
        for (int i = 0; i < ex2.length; i++)
        {
            // If element's a string, continue.
            if (typeid ex2[i] == "string")
            {
                continue;
            }
            // If it's not a string, force the conversion.
            else
            {
                ex2[i] = Convert.toString(ex2[i]);
            }
        }
        data = ex2;
    }
}
```

In converting from StringArray to external and vice versa, the conversions are defined as implicit. Thereby, nothing special is required to be done for them to be used in conjunction, and it would be no different from using StringArray with another internal type.

The above pseudo-code also illustrates the "gatekeeper" concept. In converting from StringArray to external, it is ensured that a deep clone (rather than a shallow copy) of the array is done before we send it out to the external language. This is to avoid external language potentially modifying references. Those references, in memory, are the same between the external language and the compatible language. Therefore, internal reference types that are sent out to the external language can be either deep cloned (rather than shallow copied), converted to a compatible external type, or an error (whether at compile- or runtime) may be raised preventing the operation altogether.

From the other end, in converting external back into StringArray, it is to be noticed there are several checks (and then conversions) which occur in order to make conversion from the external into its compatible internal representation. In doing so, the external reference types, when sent in to the compatible language, can be either deep cloned (rather than shallow copied), converted to a compatible internal type, or an error (whether at compile- or run-time) may be raised preventing the operation altogether.

Further, the ability to define custom conversions to and from a unified external type is also enabled. These rules can be applied to classes, interfaces, reference types, objects, class instances, instances, structures, data, and so on. These rules can also be applied to variables, constants, types, primitive types, functions, and so forth.

Furthermore, the ability to define custom conversions to and from external types (plural) is also enabled.

Still further, the ability to define whether conversions to/from external are implicit (e.g. happening automatically for permitted operations) and/or explicit (e.g. requiring a type cast) is also enabled.

Side Effects, Non-Determinism, and Caching/Memoization

Side effects may occur when, for a function or expression, in addition to returning a value, the execution of the function or expression also results in modification of state or has an observable interaction with calling functions or the outside world. For example, a function with no side effect that calculates the value of Pi may return an approximation ~3.14. However, the same function with a side effect may calculate the value of Pi and then write that value to a file in addition to returning the value.

Now, consider a function that has the side effect of appending "x" to the end of a file each time the function is called in addition to returning a value. We'll call this function, "myFunction." Now consider an expression that calls myFunction (e.g. to dynamically access an array element):

myArray[myFunction( )+1]=1;

The array element accessed is between the brackets [ . . . ]. Therefore, the value of the array index to access would be the value returned by myFunction( )+1. To check if the index being accessed exists or to perform runtime bounds checking, the following code would have to be generated:

```
if (myFunction( ) + 1 > ARRAY_MAX_SIZE) {
    throw new OutOfBoundsException( );
}
if (!myArray.hasIndex(myFunction( ) + 1)) {
    throw new InvalidIndexException( );
}
myArray[myFunction( ) + 1] = 1;
```

However, there are three different calls to myFunction( ). As calling "myFunction" will append "x" to the end of a file, instead of appending "x" once as the original source code dictated, the generated code will now append "x" three times.

Similarly, errors may occur when a function returns a value that is non-deterministic (e.g. a random number).

Therefore, when dealing with arrays, array indexes, array properties, object properties, object members, functions, function calls, class members, class fields, and class methods (collectively known as "dynamic accesses"), results of dynamic accesses and uses are cached in order to "work around" the highly-dynamic nature of dynamically-typed programming languages. For an array access, the following code may be generated to avoid aforementioned side effects or non-determinism when working with externals:

```
var temp = myFunction( ) + 1;
if (temp > ARRAY_MAX_SIZE) {
    throw new OutOfBoundsException( );
}
if (!myArray.hasIndex(temp)) {
    throw new InvalidIndexException( );
}
myArray[temp] = 1;
```

In various embodiments, runtime checks are inserted when an object property is accessed to ensure the object property's parent(s) or ancestor(s) are of the correct runtime type. In doing so, the object property may be cached (in case of side effects or non-determinism) before any runtime checks are performed. Further, accesses of the object parent may also be cached (in case of side effects or non-determinism) before any runtime checks are performed. Furthermore, in the case of consuming JavaScript, it is checked if the object property's parent is a JavaScript object, function, class, or array.

In essence, results of dynamic accesses are cached so they are only executed once. Such a cached result can be used for all runtime checks, conversions, modifications, and the original dynamic property access itself.

JSON/XML Data Type

While JSON and XML in OOP languages are typically implemented in an object-oriented manner, having a data type or primitive type allows for much more concise code that is easier to work with and maintain. The other weakness of existing methods is that the type errors or failures with JSON/XML may not appear until runtime; therefore, embedding JSON and XML into the type system and implementing static type checking on top of it can be desirable.

JSON is standardized in ECMA-404. Based on the standard, a "JSON" type can involve a collection of key/value pairs where the values can be of any valid JSON value type: object, array, number, string, true, false, and null. The specific definition for these types are defined in the ECMA-404 standard.

A JSON data type would define the syntax, semantics, and check that the keys and values in the key-value pairs are valid types in a consistent, safe, compatible, and optimized manner. Furthermore, having a JSON data type allows us to define type conversions to/from JSON and the unified external type and get the benefits of static type checking and compiler-level semantic analysis. This is not possible with an ad-hoc user-implemented JSON type using dictionaries or hash maps.

The following is an example showing usage of JSON data type:

```
JSON mydata = { };
class SomeClass { }
mydata.someString = "abc"; // ok!
mydata.someInvalidType = new SomeClass( ); // error!
```

Having compile-time guarantees for our core data interchange format, which can be so fundamental and spread throughout all of the application's fabric, gives us confidence about the correctness of our program.

The JSON data type can be a unification of various types including but not limited to:

a. String
b. Array
c. Object d. Number (8-, 16-, 32-, 64-bit signed/unsigned integers and IEEE 754 single and double floating point numbers)

e. Boolean (e.g. true and false)

f. null

The JSON data type can convert to and from the unified external type. Furthermore, any of the aforementioned subtypes of the JSON data type can be converted to and from the unified external type.

In an embodiment, the JSON data type may be implemented like a C++-like "struct" syntax where the members of the struct are limited to the subtypes of the JSON data type.

Furthermore, an XML data type can also be provided. For example, XML attributes typically expect a "string" type; an XML document may return a "document" or "XML node" type; and so on. The XML data type can convert to and from the unified external type.

The conversions can be done by the implementation (compiler, interpreter, language standard, etc) or can be defined by the user (programmer).

In various embodiments, the original line number, original column number, original file path, and other relevant data from the original file are included in a runtime error that is raised if the runtime checks fail.

Figure 9:
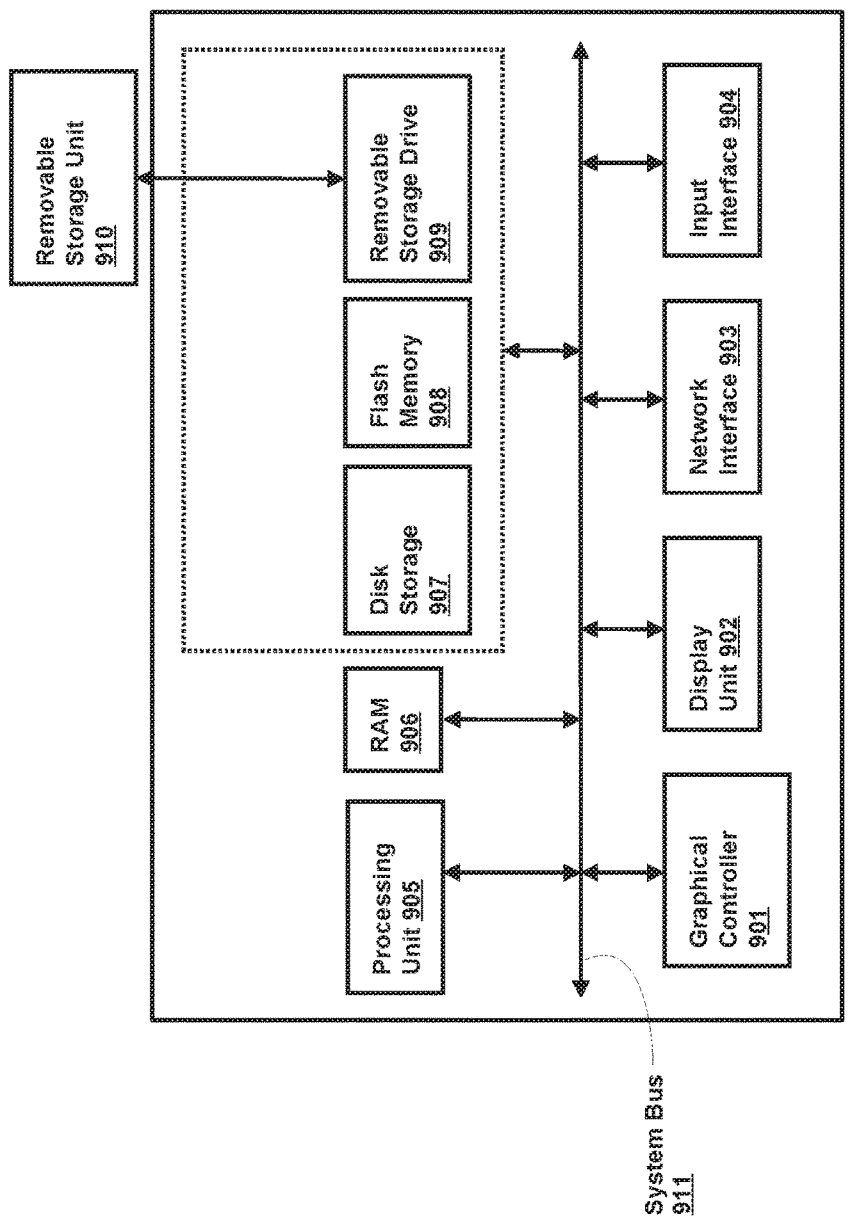
FIG. 9 illustrates a computing environment for enabling embodiments herein.

FIG. 9 illustrates a computing environment for enabling embodiments herein. A computing device in the form of a computer 900 is described. Computer 900 may include a processing unit 905, a graphical controller (901) for graphic processing, various system memory units 906/907/908/909/910, input interface 904, network interface 903, display unit 902, and a system bus 911.

The processing unit 905 can be any of various available processors. Dual microprocessors and other multiprocessor architectures also can be employed as the processing unit 905.

The system memory may include volatile memory and nonvolatile memory. Nonvolatile memory can include read only memory (ROM), programmable ROM (PROM), electrically programmable ROM (EPROM) or flash memory. Volatile memory may include random access memory (RAM) 906 which may act as external cache memory. The system bus 911 couples system physical artifacts including the system memory to the processing unit 905. The system bus 911 can be any of several types including a memory bus, memory controller, peripheral bus, external bus, or local bus and may use any variety of available bus architectures.

Computer 900 typically includes a variety of computer readable media such as volatile and nonvolatile media, removable and non-removable media. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired data and which can be accessed by computer 900.

It will be appreciated that the functions of the computer 900 can be enabled by software that can act as an intermediary between users and computer resources. This software may include an operating system which can be stored on disk storage 907, and which can control and allocate resources of the computer system 900. Disk storage 907 may be a hard disk drive connected to the system bus 911 through a removable or a non-removable memory interface.

Users of the computer can enter commands or data into the computer 900 through input and output device(s) connected to the input interface 904. Input devices may include but are not limited to a pointing device such as a mouse, trackball, stylus, touch pad, keyboard, microphone, and the like. These and other input devices connect to the processing unit 905 through the system bus 911. Output devices may include but are not limited to video and audio devices. The display device 902 may be connected to the computer 900 through the input interface 904.

Computer 900 can operate in a networked environment using connections to one or more remote computers. Network interface 903 encompasses communication networks such as local area networks (LANs) and wide area networks (WANs) but may also include other networks.

The embodiments herein disclose mechanisms to consume a dynamically-typed language in a compatible language, and to compile source code in a compatible language into a target language to add "eventual type safety" and static type checking to a superset of a dynamically-typed language, irrespective of whether the dynamically-typed language is dynamically type-checked or not. The embodiments disclosed herein can be implemented through at least one software program running on at least one hardware device. Therefore, it is understood that the scope of the protection is extended to such a program and in addition to a computer readable means having a message therein, such computer readable storage means contain program code means for implementation of one or more steps of the method, when the program runs on a computer. The computer can be any kind of device which can be programmed including e.g. any kind of computer like a server or a personal computer, or the like, or any combination thereof, e.g. one processor and two FPGAs. The device may also include means which could be e.g. hardware means like e.g. an ASIC, or a combination of hardware and software means, e.g. an ASIC and an FPGA, or at least one microprocessor and at least one memory with software modules located therein. Alternatively, mechanisms may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

The invention claimed is:

1. A computerized method of safely consuming dynamically-typed code from a statically-typed programming language, said method comprising:

consuming code of a dynamically-typed language in a statically typed compatible language;

compiling said compatible language with said consumed dynamically-typed language to a target language, said compiling further comprising:

importing definitions from said consumed dynamically-typed language;

receiving input from a user for a declaration declared with a unified external type, wherein the unified external type represents all types of the consumed dynamically-typed language as a single type, the input comprising one or more among:
  declaring at least one variable, function, object, interface, class, statement, expression, or data in the consumed dynamically-typed language with an associated identifier,
  declaring a corresponding identifier, import, or reference to a declaration from the consumed dynamically-typed language with an associated identifier in the compatible language with resulting type being the unified external type, and
  declaring a variable, function, identifier, reference, object, interface, class, import, statement, expression, or data in the compatible language that is compatible, during type checking, with the unified external type;
performing type checking with the unified external type as one of the types used by a type checker;
performing implementation-defined conversions to convert said consumed dynamically typed language to said target language;
performing user-defined conversions to convert said consumed dynamically typed language to said target language; and
programmatically generating code in said target language and executing generated code at runtime, where executing code comprises discarding the unified external type at runtime, where symbols of the unified external type assuming one or more runtime types,
wherein when converting a first type from said consumed dynamically typed language to a second type from said target language, the first type and second type are not related by way of inheritance.

2. The method in claim 1, wherein said dynamically-typed language is JavaScript.

3. The method in claim 1, wherein said compatible language is a language compatible with JavaScript.

4. The method in claim 3, wherein an external type is declared using keyword "var".

5. The method in claim 3. wherein an external type is declared using keyword "let".

6. The method in claim 3, wherein an external type is a return type of a function declared using keyword "function".

7. The method in claim 3. wherein an external type is declared using keyword "class".

8. The method in claim 3, said method further comprising implicitly converting an array to unified external type.

9. The method in claim 3, said method further comprising explicitly converting an array to unified external type.

10. The method in claim 3, said method further comprising merging an array type to the unified external type for compile-time type checking.

11. The method in claim 3, said method further comprising implicitly converting a reference type to unified external type.

12. The method in claim 3, said method further comprising explicitly converting a reference type to unified external type.

13. The method in claim 3, said method further comprising merging a reference type to a unified external type for compile-time type checking.

14. The method in claim 3, wherein a JavaScript object type is merged into a unified external type for compile-time type checking.

15. The method in claim 14, said method further comprising merging types of all properties of said JavaScript object to a unified external type for compile-time type checking.

16. The method in claim 3, where a "typeof" keyword returns at runtime the type of types belonging to both compatible language and JavaScript language.

17. The method in claim 3, where a "typeof" keyword supports custom implementation to return at runtime the type of types belonging to both compatible language and JavaScript language.

18. The method in claim 1, said method further comprising converting a unified external type to another unified external type during compile-time type checking.

19. The method in claim 1, said method further comprising bypassing properties, elements, fields, methods, and children for data of unified external type.

20. The method in claim 1, said method further comprising providing a matching wrapper for a primitive unified external type.

21. The method in claim 1, said method further comprising converting a primitive type to unified external type using conversion mechanism associated with a corresponding reference type.

22. The method in claim 1, said method further comprising converting a unified external type to a primitive type using conversion mechanism associated with a corresponding reference type.

23. The method in claim 1, said method further comprising bypassing name mangling for identifiers for symbols of unified external type.

24. The method in claim 23, wherein a keyword is provided for identifying one or more identifiers and symbols to be bypassed for name mangling.

25. The method in claim 23, wherein a symbol from said symbols has an assigned value through an expression from among an initialization expression or an assignment expression.

26. The method in claim 25, wherein said expression evaluating to an internal type having associated conversion mechanism to a unified external type.

27. The method in claim 25, wherein said expression evaluates to a unified external type.

28. The method in claim 1, said method further comprising inserting a cached result into generated code.

29. The method in claim 28, wherein said cached result is a result of a property access of a unified external type.

30. The method in claim 1, said method further comprising rejecting usages of dynamic code evaluation.

31. The method in claim 30, wherein said rejection is a compiler error.

32. The method in claim 30, wherein said rejection is a compiler warning.

33. The method in claim 30, wherein said rejection is disabling of dynamic code evaluation for external declarations.

34. The method in claim 30, wherein said rejection includes referencing a dynamic code evaluation mechanism.

35. The method in claim 30, wherein said rejection is a runtime error inserted into generated code.

36. The method in claim 30, wherein said rejection is a modification inserted into generated code.

37. The method in claim 1, inserting runtime mechanisms into generated code.

38. The method in claim 37, wherein a runtime mechanism is a runtime conversion.

39. The method in claim 38, wherein said runtime conversion has lower priority compared to a compile-time check.

40. The method in claim 37, wherein a runtime mechanism is a runtime check.

41. The method in claim 40, wherein said runtime check has lower priority compared to a compile-time check.

42. The method in claim 40, wherein said runtime check is a backup operation performed only when no corresponding conversion mechanism exists.

43. The method in claim 40, wherein said runtime check has higher priority over a runtime conversion if said runtime check is to check if said runtime conversion is available.

44. The method in claim 1, said method further comprising merging return type of a function call expression to a unified external type for compile-time type checking, when said function is one among:
   a function declared with a unified external type; and
   a function having a return type being a unified external type.

45. The method in claim 44, wherein said function is called with fewer arguments than defined parameters.

46. The method in claim 44, wherein said function is called with more arguments than defined parameters.

47. The method in claim 1, said method further comprising merging 'this' keyword to an object for compile-time type checking.

48. The method in claim 1, said method further comprising merging 'this' keyword to a unified external type for compile-time type checking.

49. The method in claim 44, said method further comprising merging type of 'arguments' object to one among an array, an object, and a unified external type for compile-time type checking.

50. The method in claim 1, said method further comprising inserting at least one among a runtime check and a runtime error into generated code when an operation is detected involving a unified external type.

51. The method in claim 50, wherein a runtime error is raised when corresponding runtime check fails.

52. The method in claim 50, wherein an operation is cached before performing a runtime check on said operation.

53. The method in claim 50, wherein a runtime check on an operation is asserting that a callee is a function type at runtime, when said operation is a function call expression with the callee being unified external type at compile time.

54. The method in claim 53, wherein said function call is cached before performing runtime checks on said operation.

55. The method in claim 50, wherein said runtime check is asserting if instantiated subject is instantiable at runtime, when said operation is an instantiation operation.

56. The method in claim 55, wherein said instantiation operation is cached before performing runtime checks.

57. The method in claim 50, wherein said runtime check is asserting runtime type of one or more parents of an object property, when said operation is accessing said object property.

58. The method in claim 57, wherein said object property is cached before performing runtime checks.

59. The method in claim 57, wherein said one or more parents of said object property is cached before performing runtime checks.

60. The method in claim 57, wherein said runtime check includes checking if object property's parent is among JavaScript object, JavaScript function, JavaScript class, and JavaScript array.

61. The method in claim 50, said method further comprising a runtime check asserting if a throw statement results in a valid exception, when said operation is a throw statement and when the thrown subject is a unified external type at compile time.

62. The method in claim 50, said method further comprising a runtime check asserting if an iteration is possible, when said operation is an iteration operation.

63. The method in claim 50, wherein a runtime error includes at least original source line number, column number, and file path from source file.

64. The method in claim 1, said method further comprising rejecting an operation when a unified external type occurs within said operation.

65. The method in claim 64, wherein said rejection is one among a compile-time error, and compile-time warning.

66. The method in claim 64, wherein said rejection is one among a runtime error, a runtime warning, and a runtime exception.

67. The method in claim 1, said method further comprising aborting checking properties of a reference type at compile time when a unified external type is encountered and when at least one of the following conditions are satisfied:
   said reference type is a unified external type; and
   a property of data of said reference type is a unified external type.

68. The method in claim 67, wherein access operation of data of said reference type occurs with a dot accessor.

69. The method in claim 67, wherein access operation of data of said reference type occurs with an index accessor.

70. A non-transitory computer-readable medium including contents configured to cause a computing system to safely consume dynamically-typed code from a statically-typed programming language by performing a method, said method comprising:
   consuming code of a dynamically-typed language in a statically typed compatible language;
   compiling said compatible language with said consumed dynamically-typed language to a target language, said compiling further comprising:
      importing definitions from said consumed dynamically-typed language;
      receiving input from a user for a declaration declared with a unified external type, wherein the unified external type represents all types of the consumed dynamically-typed language as a single type, the input comprising one or more among:
         declaring at least one variable, function, object, interface, class, statement, expression, or data in the consumed dynamically-typed language with an associated identifier,
         declaring a corresponding identifier, import, or reference to a declaration from the consumed dynamically-typed language with an associated identifier in the compatible language with resulting type being the unified external type, and
         declaring a variable, function, identifier, reference, object, interface, class, import, statement, expression, or data in the compatible language that is compatible, during type checking, with the unified external type;
      performing type checking with the unified external type as one of the types used by a type checker;
      performing implementation-defined conversions to convert said consumed dynamically typed language to said target language;

performing user-defined conversions to convert said consumed dynamically typed language to said target language; and programmatically generating code in said target language and executing generated code at runtime, where executing code comprises discarding the unified external type at runtime, where symbols of the unified external type assuming one or more runtime types, wherein when converting a first type from said consumed dynamically typed language to a second type from said target language, the first type and second type are not related by way of inheritance.

71. The computer-readable medium in claim 70, wherein a keyword is used to declare one or more external types as unified external type, when the statically-typed language is a nominally-typed programming language.

72. The computer-readable medium in claim 70, wherein an "external"keyword modifier is used to modify at least one among variable declarations, function declarations, function expressions, method declarations, and classes to the unified external type.

73. The computer-readable medium in claim 70, wherein an "external"keyword modifier is used to convert at least one among variable declarations, function declarations, function expressions, method declarations, and classes to the unified external type.

74. The computer-readable medium in claim 70, wherein a variable that can hold more than one type of data at runtime is merged to a unified external type at compile time.

75. The computer-readable medium in claim 70, wherein the types from the dynamically-typed language that are unified to the unified external type include at least one among string, number, boolean, object, function, and undefined, when said dynamically typed language is JavaScript.

76. The computer-readable medium in claim 70, wherein the types that are dynamically-typed and unified to the unified external type include Document Object Model (DOM) API (Application Programming Interface) types.

77. The computer-readable medium in claim 70, wherein the types that are dynamically-typed and unified to the unified external type at compile time are ECMAScript host object types.

78. The computer-readable medium in claim 70, wherein the consumed dynamically-typed language is restricted from accessing types of the statically-typed compatible language.

79. The computer-readable medium in claim 70, wherein one or more external types include types that are type casted to the unified external type.

80. The computer-readable medium in claim 70, wherein a unified external type unifies primitive types.

81. The computer-readable medium in claim 70, wherein a unified external type unifies reference types.

82. The computer-readable medium in claim 70, wherein a unified external type unifies void types.

83. The computer-readable medium in claim 70, wherein a unified external type unifies JavaScript Object types.

84. The computer-readable medium in claim 70, wherein a unified external type unifies numeric types.

85. The computer-readable medium in claim 70, wherein a unified external type unifies class types.

86. The computer-readable medium in claim 70, wherein a unified external type unifies function types.

87. The computer-readable medium in claim 70, wherein a unified external type unifies textual types.

88. The computer-readable medium in claim 70, wherein an implementation-defined conversion is to convert an internal type to a unified external type.

89. The computer-readable medium in claim 88, wherein said conversion is an implicit conversion.

90. The computer-readable medium in claim 88, wherein said conversion is an explicit conversion.

91. The computer-readable medium in claim 88, wherein said conversion is to convert a type-checked array to a non-type checked array.

92. The computer-readable medium in claim 91, wherein said type-checked array is a type of said statically-typed compatible language.

93. The computer-readable medium in claim 91, wherein said non-type checked array is a type of said dynamically-typed language.

94. The computer-readable medium in claim 88, wherein said conversion is to convert a type-checked array to a runtime type-checked array.

95. The computer-readable medium in claim 94, wherein said conversion is an implicit conversion.

96. The computer-readable medium in claim 94, wherein said conversion is an explicit conversion.

97. The computer-readable medium in claim 94, wherein said type-checked array is a type of said statically-typed compatible language.

98. The computer-readable medium in claim 94, wherein said type-checked array is a type of said dynamically-typed language.

99. The computer-readable medium in claim 88, wherein said conversion is to convert a typechecked array to a JavaScript array, when said dynamically-typed language is JavaScript.

100. The computer-readable medium in claim 99, wherein said type-checked array is a type of said statically-typed compatible language.

101. The computer-readable medium in claim 99, wherein said JavaScript array is a type of said dynamically-typed language.

102. The computer-readable medium in claim 88, wherein said conversion is to convert a typechecked key-value pair to a non-type-checked key-value pair.

103. The computer-readable medium in claim 102, wherein said conversion is an implicit conversion.

104. The computer-readable medium in claim 102, wherein said conversion is an explicit conversion.

105. The computer-readable medium in claim 102, wherein said type-checked key-value pair is a type of said statically-typed compatible language.

106. The computer-readable medium in claim 102, wherein said non-type checked key-value pair is a type of said dynamically-typed language.

107. The computer-readable medium in claim 88, wherein said conversion is to convert a typechecked key-value pair to a runtime type-checked key-value pair.

108. The computer-readable medium in claim 107, wherein said conversion is an implicit conversion.

109. The computer-readable medium in claim 107, wherein said conversion is an explicit conversion.

110. The computer-readable medium in claim 107, wherein said type-checked key-value pair is a type of said statically-typed compatible language.

111. The computer-readable medium in claim 107, wherein said runtime type-checked key-value pair is a type of said dynamically-typed language.

112. The computer-readable medium in claim 88, wherein said conversion is to convert a typechecked key-value pair to a JavaScript object, when said dynamically typed language is JavaScript.

113. The computer-readable medium in claim 112, wherein said conversion an implicit conversion.

114. The computer-readable medium in claim 112, wherein said conversion an explicit conversion.

115. The computer-readable medium in claim 112, wherein said type-checked key-value pair is a type of said statically-typed compatible language.

116. The computer-readable medium in claim 112, wherein said JavaScript object is a type of said dynamically-typed language.

117. The computer-readable medium in claim 88, said method further comprising raising a warning at compile time if there is a loss of precision during said conversion.

118. The computer-readable medium in claim 88, said method further comprising raising an error at compile time if there is a loss of precision during said conversion.

119. The computer-readable medium in claim 88, said conversion is to convert literals to non-type checked values implicitly.

120. The computer-readable medium in claim 88, said conversion is to convert literals converted to runtime type-checked values implicitly.

121. The computer-readable medium in claim 88, said conversion is to convert literals to equivalent JavaScript values implicitly.

122. The computer-readable medium in claim 88, said method further comprising providing a matching reference type for said conversion, when said unified external type is a primitive type with a matching reference type.

123. The computer-readable medium in claim 88, said method further comprising applying a conversion defined for a reference type to a corresponding primitive type.

124. The computer-readable medium in claim 70, wherein an implementation-defined conversion is to convert a unified external type to an internal type.

125. The computer-readable medium in claim 124, wherein said conversion is an implicit conversion.

126. The computer-readable medium in claim 124, wherein said conversion is an explicit conversion.

127. The computer-readable medium in claim 124, wherein said conversion occurs through autoboxing.

128. The computer-readable medium in claim 124, said method further comprising converting an internal integer type symbol value to zero (0), when said symbol with unified external type at compile time has a textual type at runtime with text data that is not a textual representation of a real number or IEEE 754 single/double floating point value.

129. The computer-readable medium in claim 124, said method further comprising converting symbol with unified external type to zero (0), when said symbol with the unified external type at compile time has a reference type at runtime.

130. The computer-readable medium in. claim 124, said method further comprising inserting wrapping instructions into generated code to wrap integers.

131. The computer-readable medium in claim 70, wherein a conversion is from a primitive type to a unified external type.

132. The computer-readable medium in claim 70, wherein a conversion is from a unified external type to a primitive type.

133. The computer-readable medium in claim 70, wherein a conversion is from a reference type to a unified external type.

134. The computer-readable medium in claim 70, wherein a conversion is from a unified external type to a reference type.

135. The computer-readable medium in claim 70, wherein said user-defined conversion is to convert an internal type to a unified external type.

136. The computer-readable medium in claim 135, wherein said user-defined conversion is for a user-defined type.

137. The computer-readable medium in claim 136, wherein subtypes of said user-defined type do not inherit said user-defined conversion.

138. The computer-readable medium in claim 136, wherein runtime reflection or mirrors are used for conversion, when said user-defined type is generic.

139. The computer-readable medium in claim 135, wherein said user-defined conversion is an implicit conversion.

140. The computer-readable medium in claim 135, wherein said user-defined conversion is an explicit conversion.

141. The computer-readable medium in claim 135, said method further comprising making an internal type safe for conversion before converting to a unified external type, when said internal type is a reference type.

142. The computer-readable medium in claim 141, wherein said internal type is made safe by inserting one or more deep cloning instructions into generated code.

143. The computer-readable medium in claim 141, wherein said internal type is made safe by inserting a conversion to a compatible type in generated code.

144. The computer-readable medium in claim 141, wherein said internal type is made safe by providing a compile-time notification.

145. The computer-readable medium in claim 141, wherein said internal type is made safe by inserting runtime checks into generated code.

146. The computer-readable medium in claim 70, wherein said user-defined conversion is to convert a unified external type to an internal type.

147. The computer-readable medium in claim 146, wherein said user-defined conversion is for a user-defined type.

148. The computer-readable medium in claim 146, wherein subtypes of said user-defined type do not inherit said user-defined conversion.

149. The computer-readable medium in claim 146, wherein said user-defined conversion is an implicit conversion.

150. The computer-readable medium in claim 146, wherein said user-defined conversion is an explicit conversion.

151. The computer-readable medium in claim 146, said method further comprising making a unified external type safe for conversion before converting to a corresponding internal type, when said unified external type is a reference type.

152. The computer-readable medium in. claim 151, wherein said unified external type is made safe by inserting one or more deep cloning instructions into generated code.

153. The computer-readable medium in claim 151, wherein said unified external type is made safe by inserting a conversion to a compatible type in generated code.

154. The computer-readable medium in. claim 151, wherein said unified external type is made safe by providing a compile-time notification.

155. The computer-readable medium in claim 151, wherein said unified external type is made safe by inserting runtime checks into generated code.

156. The computer-readable medium in claim 70, wherein said importing is done using one or more importables.

157. The computer-readable medium in claim 156, wherein said importing of definitions using an importable consists of at least 50% declarations having unified external type.

158. The computer-readable medium in claim 156, wherein an importable from said one or more importables is for JavaScript.

159. The computer-readable medium in claim 156, wherein an importable from said one or more importables is for ECMAScript.

160. The computer-readable medium in claim 156, wherein an importable from said one or more importables is for web browser DOM (Document Object Model) API (Application Programming Interface).

161. The computer-readable medium in claim 156, wherein an importable from said one or more importables is for jQuery.

162. The computer-readable medium in claim 156, wherein an importable from said one or more importables is for Node.js API.

163. The computer-readable medium in claim 156, wherein an importable from said one or more importables is for the combination of JavaScript language, ECMAScript language, and web browser DOM API.

164. The computer-readable medium in claim 156, wherein importables are implementation defined.

165. The computer-readable medium in claim 156, wherein importables are user-defined.

* * * * *